Figures 1, 2:
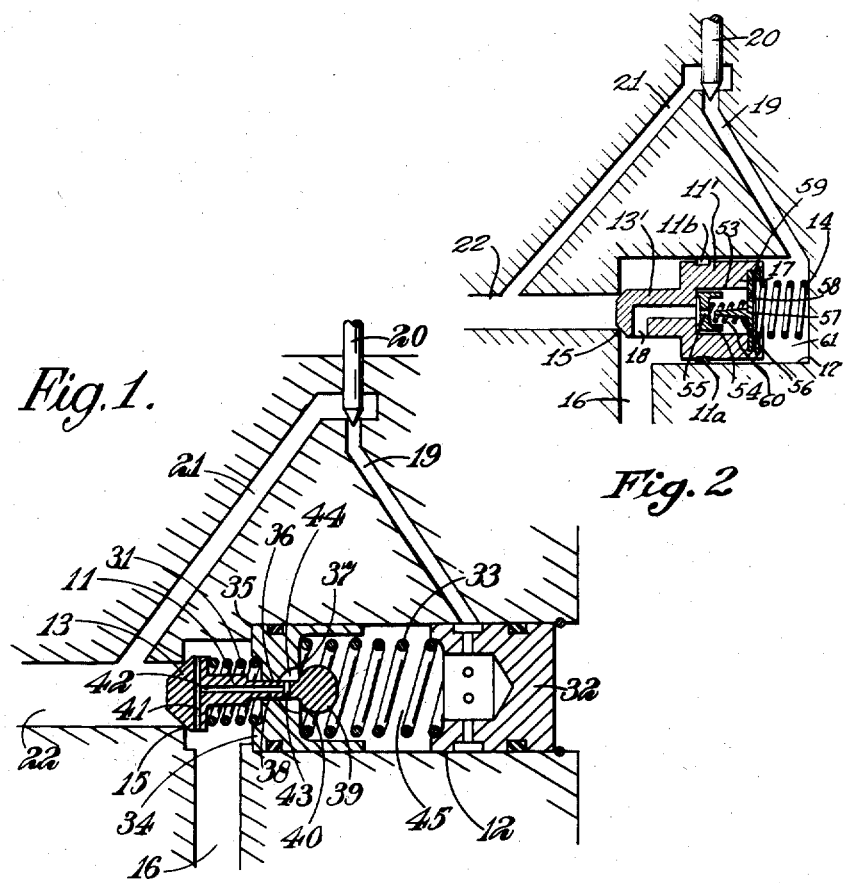

March 8, 1960

G. ORLOFF 2,927,766

SERVO VALVE MECHANISM

Filed Oct. 11, 1954

INVENTOR
George Orloff
By Watson, Cole, Grindle & Watson
ATTORNEYS

United States Patent Office 2,927,766
Patented Mar. 8, 1960

2,927,766
SERVO VALVE MECHANISM

George Orloff, Gloucester, England, assignor to British Messier Limited, Gloucester, England, a British company Application October 11, 1954, Serial No. 461,437

Claims priority, application Great Britain October 15, 1953

6 Claims. (Cl. 251—35)

This invention comprises improvements in or relating to hydraulic valve units of the kind whose opening and closing movements are initiated by pilot valves, and is more particularly concerned with such valve units of the type (hereafter referred to as the type described) in which a main valve is provided with a valve-operating piston housed in a valve cylinder and is resiliently biased onto a seating thereby to cut off the inlet passage from the outlet or delivery passage, the valve cylinder chamber on one side of the valve-piston is connected to the inlet passage, and that on the opposite side to the delivery passage by way of a by-pass in which is situated the initiating pilot valve, and a bleed passage connects said two chambers, the arrangement being such that on opening of the pilot valve there is an immediate reduction of pressure on the pilot valve side of the main-valve piston so that the main valve is moved against its bias, away from the seating. Such units are for example used for controlling the admission and release of operating fluid from hydraulic jacks or other hydraulic mechanisms.

Valve units of the type described as at present constructed have characteristics such that the curves of opening and closing movement plotted against time are somewhat arbitrarily selected and are not adjustable. They may, therefore, depart to considerable length from what is ideal for the particular use in view. It is an object of the present invention to provide an improved valve unit of the type described.

According to the present invention a valve unit of the type described is provided with means to vary the effective cross-sectional area of the bleed passage, which means is responsive to the pressure difference across the valve piston, or to the position of the valve, so that the rate of travel of the valve between its fully open and closed positions is adjusted to conform with a desired valve characteristic.

In one form, the piston has an axial bore, a shuttle member is axially slidable in said bore and has an orifice through it forming part of the bleed passage, the shuttle being spring-urged toward one end of the bore, and a needle member carried by the piston extends toward the shuttle orifice from the opposite end of the bore, whereby when the shuttle moves in the bore against the spring action the needle member comes into action as a throttling plug to reduce the area for liquid flow through said orifice.

In another arrangement, the piston has a through bore opening into an enlarged mouth at the end farther from the main valve, a stem on the valve passes slidably through said bore and has a throttling plug on its end to seat in the enlarged mouth thereof, and the bleed passage comprises a passage in the interior of the stem that opens into the space within the enlarged mouth between the throttling plug and the piston bore ending in said mouth.

The following are descriptions by way of example of constructions according to the invention, reference being had to the accompanying diagrammatic drawings, in which:

Figure 1 shows an arrangement in which the main valve and piston are separate members mechanically coupled together, and Figure 2 a further arrangement with valve and piston integral.

In Figure 1 a main valve 11 having a head 13 is housed in a valve chamber comprising a cylinder 12 and is spring-urged onto a seating 15 at one end of said chamber by a spring 31. The cylinder is closed at the opposite end to the seating by a plug 32, and there is working in the cylinder a valve piston 34 which is a separate member from the valve head 13. A pressure fluid inlet passage 16 leads into the valve chamber between the seating 15 and the piston 34, and beyond the seating is a delivery passage 22. The piston 34 abuts against a shoulder 35 formed in the cylinder 12 near the main valve seating 15, and is urged against the shoulder by a spring 33 which at its end furthermost from the valve head 13, abuts against the plug 32. The spring 31 which urges the main valve 11 on to its seating 15 abuts on the other side of the piston 34. A cylindrical bore or aperture 36 is formed in the piston and on the side nearest the plug 32 the aperture is enlarged to give it a substantially hemispherical counter-sunk mouth 44 opening into the chamber 45 in the valve cylinder 12 between piston and plug. The main valve 11 is provided with a rearwardly-extending stem or neck 38 which passes through the aperture 36 in the piston 34 and terminates in a ball-shaped throttling plug 39 which sits in the countersunk mouth 44 of the aperture in the piston and which can be adjusted so that when the main valve 11 is on its seat and the piston 34 is abutted against the shoulder 35 there is, between the throttling plug 39 and the rim 37 of the mouth, a small annular bleed opening 40. In the main valve 11 there is a T-shaped bleed passage 41, 42 connecting the delivery pressure with another cross branch 43 at the foot of the T opening into the countersunk mouth 44 in the piston 34 between the piston and the throttling plug 39. The chamber 45 communicates, through a bore in the plug 32 and radial openings in the wall of said bore, with a passage 19; this passage 19 meets a passage 21 leading to the delivery 22, and communication between the passages 19 and 21 is controlled by a pilot valve 20.

When the main and pilot valves 11, 20 are closed the pressure from the pressure supply passage 16 is communicated through and builds up in, the bleed passage 41, 42, the piston countersunk mouth 44, the annular bleed opening 40 formed between this mouth and the throttling plug 39, the chamber 45 between the piston 34 and plug 32 and in the passage 19 to the underside of the closed pilot valve 20.

In order to supply fluid pressure to the delivery passage 22 the pilot valve 20 is opened and the initial effect is to release, through the passage 19 to the pilot valve, the pressure in the chamber 45 between piston and plug 32. This change in pressure distribution moves the piston 34 towards the plug 32 closing the annular bleed opening 40 and thus, when the counter sunk mouth 44 makes contact with the throttling plug 39, drawing the main valve 11 also towards the plug 32 and opening the delivery passage 22 to the pressure supply 16. The delivery pressure then causes the main valve to move towards the plug 32 relative to the piston 34, thereby reopening the annular passage 40.

After this initial phase, the pressure in the delivery passage 22 is communicated back through the circuit to the chamber 45 between piston 34 and plug 32 and, along with the pressure of the piston spring 33 forces the piston back on to the shoulder 35 in the cylinder 12. The pressure in the inlet passage 16 is communicated by the bleed 41, 42 to the countersunk mouth 44 and through the annular passage 40, the rate of flow depending on the restrictions in the bleed passage and the annular opening, and the pressure difference between the countersunk mouth and the chamber 45. It will be apparent therefore that the extent to which the throttling plug 39 is moved towards the plug 32 and hence the opening of the annular passage 40 and therefore the rate of flow through the passage will depend on these pressure differences, that is, the arrangement provides a rate of flow which is a function of pressure difference across the annular passage 40.

To close the valve it is necessary to close the pilot valve 20, and the bleed passage 41, 42 then re-establishes in chamber 45 formed between the piston 34 and the plug 32 the pressure of the supply passage 16, the rate at which this happens and hence the rate of closing of the main valve 11 depending to a substantial extent on the pressure drop across the annular opening 40.

Figure 2 shows a further construction according to the invention. In this case the valve 11' housed in the cylinder 12' has a piston portion 17 integral therewith, the head 13' of the valve being urged on to the seating 15 by a coil spring 14 behind the piston. The valve piston 17 is provided with a piston ring 11a which is split at 11b. An inlet 16 communicating with a source of fluid under pressure opens through the wall of the cylinder 12'. The space in the cylinder 12' on the right-hand side of the valve piston 17 as drawn forms a chamber 61. The main valve 11' is provided with a bleed passage 18 which leads from the inlet side of the valve between the valve seating 15 and the piston 17 to a cylindrical chamber or bore 53 within the valve piston which is open at its right-hand end to the chamber 61. This chamber 53 houses a sliding orifice shuttle 54 having an orifice 55. A throttling plug or needle 56 is fitted to the right (as drawn) of the orifice 55 and its base 57 which is provided with apertures 58 is retained with respect to the valve piston by means of a circlip 59. A small coil spring 60 is interposed between the orifice shuttle 54 and throttling needle base 57 and normally urges the shuttle to the left. The left-hand end of coil spring 14 bears against the outer or right-hand side of the throttling needle base 57.

From the chamber 61 a passage 19 leads as before to the pilot valve 20 the other side of which is in communication through passage 21 with the delivery passage 22.

When the valve 11' and the pilot valve 20 are closed the pressure in the inlet passage 16 is communicated by the bleed passage 18, orifice 55 and apertures 58 to chamber 61 and passage 19, where it builds up to the value of that in passage 16. Flow also occurs through the gap 11b in the piston ring 11a and, due to leakage, between the orifice shuttle periphery and the internal wall of the valve piston 17. The valve 11' is thus held on its seat by the pressure of the spring 14, and the differential pressure across the valve (i.e. between the passage 22 and chamber 61) gives rise to a load which assists the spring in holding the valve on its seat.

When it is desired to admit pressure to the delivery line 22 the pilot valve 20 is opened thus placing the chamber 61 and passage 19 in communication, by passage 21, with the line 22. The substantially instantaneous effect of this is to release the pressure in chamber 61 so that the orifice shuttle 54 moves to the right under the higher pressure on its left-hand side which overcomes the pressure of coil spring 60. Thus the orifice 55 moves close to or up against the throttling needle 56 and either reduces or stops the bleed of pressure fluid to the chamber 61. The release of pressure in chamber 61 also unbalances the valve 11' so that it then moves to the right against the pressure of spring 14. As soon as the valve moves away from the seating 15 pressure fluid passes from the supply line 16 to the delivery line 22. The valve then remains open so long as there is sufficient pressure drop between inlet and outlet, due to flow, to keep the orifice shuttle 54 adjacent the throttling needle 56.

When the pilot valve 20 is closed the pressure difference between the supply line 16 and chamber 61 approaches equality due to the small leak through the gap 11b in the piston ring 11a and between the orifice shuttle 54 and the internal wall of the valve piston 17. The spring 60 then acts to separate the orifice shuttle and the throttling needle, thus reopening the orifice. This permits a more rapid but controlled flow from passage 16 to chamber 61 and speeds up the closing of the valve 11' under the influence of spring 14.

I claim:

1. A hydraulic valve unit of the kind comprising a housing, a valve chamber in said housing, a delivery passage leading from one end of the valve chamber, a valve-seating between the valve chamber and the delivery passage and a main valve operating in the valve chamber and having means resiliently biasing said main valve onto the seating to cut off the valve chamber from the delivery passage, an operating piston for the main valve working in a part of the valve chamber that constitutes a cylinder therefor, an inlet passage leading into the valve chamber between the valve seating and the piston, a bleed passage connecting the valve chamber spaces on opposite sides of the piston, a by-pass connecting the delivery passage with the valve chamber on the side of the piston remote from the valve seating, and a pilot valve in said by-pass whereby on opening of the pilot valve there is a reduction of pressure on said remote side of the piston so that the main valve is moved against its bias away from the seating, and wherein the piston has a through bore opening into an enlarged mouth at the end farther from the main valve, a stem on the valve passes slidably through said bore and has a throttling plug on its end to seat in the enlarged mouth thereof, and the bleed passage comprises a passage in the interior of the stem that opens into the space within the enlarged mouth between the throttling plug and the piston bore ending in said mouth.

2. A valve unit as claimed in claim 1 wherein the main valve works in a reduced diameter end portion of the valve chamber, the valve piston is spring-urged on to the shoulder formed at the commencement of the reduced diameter portion, and the main valve biasing means comprises a coil spring bearing at one end on the valve and at the other on the piston.

3. A valve unit as claimed in claim 1 wherein the enlarged mouth is substantially hemispherical in contour, and the throttling plug is of corresponding ball shape.

4. A hydraulic valve unit of the kind comprising a housing, a valve chamber in said housing, a delivery passage leading from one end of the valve chamber, a valve seating between the valve chamber and the delivery passage and a main valve operating in the valve chamber and having means resiliently biasing said main valve onto the seating to cut off the valve chamber from the delivery passage, an operating-piston for the main valve working in a part of the valve chamber that constitutes a cylinder therefor, an inlet passage leading into the valve chamber between the valve seating and the piston, a bleed passage connecting the valve chamber spaces on opposite sides of the piston, a by-pass connecting the delivery passage with the valve chamber on the side of the piston remote from the valve seating, and a pilot valve in said by-pass whereby on opening of the pilot valve there is a reduction of pressure on said remote side of the piston so that the main valve is moved against its bias away from the seating, and wherein the piston is connected to said main valve to move as one with the main valve and has an axial bore, a shuttle member is axially slidable in said bore and has an orifice through it forming part of the bleed passage, the shuttle being spring-urged against the fluid pressure toward one end of the bore, and a needle member constituting a throttling plug and carried by the piston extends toward the shuttle orifice from the opposite end of the bore, whereby when the shuttle moves in the bore against the spring force the needle member comes into action to reduce the area for liquid flow through said orifice.

5. A valve unit as claimed in claim 4 wherein the piston is provided with an axially split piston ring whereby leakage of liquid can take place between the piston and the valve cylinder wall through the split.

6. A hydraulic valve unit of the kind comprising a housing, a valve chamber in said housing, a delivery passage leading from one end of the valve chamber, a valve seating between the valve chamber and the delivery passage and a main valve operating in the valve chamber, means resiliently biasing said main valve onto the seating to cut off the valve chamber from the delivery passage, an operating-piston for the main valve working in a part of the valve chamber that constitutes a cylinder therefor, an inlet passage leading into the valve chamber between the valve seating and the piston, the side of the piston adjacent the inlet passage being exposed to inlet pressure, a bleed passage through said piston connecting the valve chamber spaces on opposite sides of the piston, a bypass having a pilot valve therein whereby on opening of the pilot valve there is a reduction of pressure on the opposite side of the piston so that the main valve is moved against its bias away from the seating, and wherein there is provided means for varying the rate of travel of the said main valve by varying the flow area through the bleed passage in accordance with a function of the difference of pressure on opposite sides of the piston, said flow area varying means comprising a throttling plug fixed with respect to the main valve and a member defining part of the bleed passage cooperable with and movable relative to said plug.

References Cited in the file of this patent

UNITED STATES PATENTS

| | | |
|---|---|---|
| 781,913 | Schutte | Feb. 7, 1905 |
| 1,046,236 | Wagner | Dec. 3, 1912 |
| 1,830,005 | Sloan | Nov. 3, 1931 |
| 2,000,297 | Putnam | May 7, 1935 |
| 2,053,640 | Sloan | Sept. 8, 1936 |
| 2,310,130 | Thumim | Feb. 2, 1943 |
| 2,635,636 | Carson | Apr. 21, 1953 |
| 2,699,316 | Mosher | Jan. 11, 1955 |